United States Patent
Park et al.

(10) Patent No.: US 7,941,825 B2
(45) Date of Patent: May 10, 2011

(54) EFFICIENT NVOD SERVICE METHOD FOR VARIOUS CLIENT ENVIRONMENTS AND APPARATUS THERE-FOR

(75) Inventors: Ho-Hyun Park, Yongin-si (KR); Min-Sung Jung, Yongin-si (KR); Jae-Hwa Park, Seoul (KR); Yi-Chul Kang, Seoul (KR); Jong-Youl Jeong, Seoul (KR); Jae-Sik Hwang, Seongnam-si (KR); Yong-Gu Kim, Seoul (KR)

(73) Assignee: Chung-Ang University Industry-Academic Cooperation Foundation (KR)

( * ) Notice: Subject to any disclaimer, the term of this patent is extended or adjusted under 35 U.S.C. 154(b) by 405 days.

(21) Appl. No.: 11/910,300

(22) PCT Filed: Nov. 7, 2006

(86) PCT No.: PCT/KR2006/004636
§ 371 (c)(1),
(2), (4) Date: Apr. 3, 2008

(87) PCT Pub. No.: WO2007/066905
PCT Pub. Date: Jun. 14, 2007

(65) Prior Publication Data
US 2009/0217331 A1      Aug. 27, 2009

(30) Foreign Application Priority Data
Nov. 7, 2005   (KR) .................. 10-2005-0105955

(51) Int. Cl.
H04N 7/173  (2011.01)

(52) U.S. Cl. .............. 725/101; 725/87; 725/88; 725/89; 725/90; 725/91; 725/92; 725/93; 725/94; 725/95; 725/96; 725/97; 725/98; 725/102; 725/103; 725/104

(58) Field of Classification Search .............. 725/87–98, 725/101–104
See application file for complete search history.

(56) References Cited

U.S. PATENT DOCUMENTS

| | | | |
|---|---|---|---|
| 5,594,491 A | 1/1997 | Hodge et al. | |
| 5,764,893 A | 6/1998 | Okamoto et al. | |
| 5,936,659 A * | 8/1999 | Viswanathan et al. | 725/103 |
| 6,502,139 B1 * | 12/2002 | Birk et al. | 709/233 |
| 7,143,431 B1 * | 11/2006 | Eager et al. | 725/101 |
| 7,587,736 B2 * | 9/2009 | Summers et al. | 725/95 |

FOREIGN PATENT DOCUMENTS

WO    2004/054263    6/2004

OTHER PUBLICATIONS

International Search Report for corresponding International Application No. PCT/KR2006/004636 dated Feb. 27, 2007.
Written Opinion of the International Searching Authority for corresponding International Application No. PCT/KR2006-004636 dated Feb. 27, 2007.
Japanese Office Action—Japanese Application No. 2008-505244 issued Jun. 22, 2010, citing WO2004/054263.

* cited by examiner

Primary Examiner — Jason P Salce
(74) Attorney, Agent, or Firm — Cantor Colburn LLP

(57) ABSTRACT

An efficient near video on demand (NVOD) service for various client environments is provided. The NVOD service method for transmitting video data including moving pictures to a plurality of clients in a network includes identifying a relative network bandwidth "m" of a client with respect to a video playout bandwidth, dividing the video data into data segments having different sizes according to the relative network bandwidth "m" and transmitting the data segments to the client through a plurality of channels.

13 Claims, 3 Drawing Sheets

EFFICIENT NVOD SERVICE METHOD FOR VARIOUS CLIENT ENVIRONMENTS AND APPARATUS THERE-FOR

This application is a 371 national stage application of International Application No. PCT/KR2006/004636 filed on Nov. 7, 2006, which claims priority to Korean Patent Application No. 10-2005-0105955, filed on Nov. 7, 2005, the disclosures of which are incorporated herein in their entirety by reference.

TECHNICAL FIELD

The present invention relates to an efficient near video on demand (NVOD) service for various client environments and an apparatus therefor.

BACKGROUND ART

With the development of a hybrid fiber coax (HFC), an x digital subscriber line (xDSL), and a fiber to the home (FTTH) during recent several years, high transmission speed has been accomplished in network environments. A broadband convergence network (BcN) has widened network bandwidths in Korea and next-generation broadband networks have been increasingly built all over the world. In addition, various wireless environments such as the 802.11 standard, satellite broadcasting, digital multimedia broadcasting (DMB), and wireless broadband Internet (WiBro) have been researched and developed according to various user environments. Accordingly, at present, small terminals having mobility and high-performance terminals such as existing personal computers (PCs) and televisions (TVs) coexist.

Video on demand (VOD) services provide videos in real time at user's requests. When using a VOD service, a user can see a drama that has already been broadcasted on the Internet or can see a movie on the Internet without renting a video from a video rental shop. In a real video on demand (RVOD) service, connection is newly made for each request of a user. A network bandwidth is limited and is not sufficient to provide a popular video for many users through RVOD. In other words, with only broadband networks, a video cannot be appropriately provided for hundreds of thousands of people or several million people through the RVOD at a time. To overcome this limit of the RVOD service, a near video on demand (NVOD) has been suggested. Conventional NVOD services will be briefly described below.

<Staggered Broadcasting>

RVOD requires a huge bandwidth of a server according to user's requests. To overcome this problem, various NVOD service methods have been suggested. Of these methods, staggered broadcasting is the most widespread conventional NVOD service method. In the staggered broadcasting, a whole video is transmitted through many channels at predetermined intervals so that many subscribers can view the video at a time. For example, when a 120-minute video is transmitted through 12 channels, a time interval between the channels is 10 minutes, and therefore, an access latency is 10 minutes. The access latency is a delay time from a request by a user (or a viewer) for a video to a play of the video. The staggered broadcasting is advantageous in that storage space is not necessary in a terminal (hereinafter, referred to as a client) and is disadvantageous in that the access latency is too great for the bandwidth of a server.

<Pyramid Broadcasting (PB)>

This method is the first method of dividing video data into segments and transmitting the segments. In the PB, video data is divided into many segments and the segments are transmitted using many channels. When a video is divided into "K" segments, "K" channels are needed. Here, the size of a segment is $\alpha^i$, where i=0, 1, 2, 3, . . . , k) and $\alpha \geq 1$. When $\alpha$ is 2, data is divided into segments at a ratio of 1:2:4:8:16:32 . . . and the segments are repeatedly transmitted through the "k" channels. A viewer receives the video through the "k" channels which change in order. For example, when a 120-minute video is transmitted through 12 b channels (where "b" is a playback bit rate of the video), an access latency is reduced to 1 minute or less, which is at least 90% less than that in the staggered broadcasting. In other words, when the access latency is the same between the staggered broadcasting and the PB, the PB requires just a very small band compared to the staggered broadcasting. However, the PB is disadvantageous in that a client needs storage space for storing at least 50% of the video and also needs a bandwidth of 2 $\alpha$b.

<Skyscraper Broadcasting (SB)>

SB is characterized by that it can be used in an environment with a client having limited storage space. Like in the PB, video data is divided into segments and the segments are transmitted through many channels in the SB. However, in the SB, the video data is divided at a ratio of 1:2:2:5:5:12:12:25:25:52:52 . . . , and therefore, the bandwidth efficiency of a server is increased. In addition, a client needs a network bandwidth of only 2 b. However, the SB has low channel efficiency and the channel efficiency is decreased when the network bandwidth of the client is increased.

<Harmonic Broadcasting (HB)>

In the HB, video data is uniformly divided into segments and all segments are simultaneously downloaded. Since it would be good only if each segment is downloaded by the time when it is supposed to be played, an i-th segment is transmitted with a bandwidth of $$\frac{1}{i}b.$$

The HB provides good efficiency for a server but cannot be used for a client with a limited bandwidth since the client must receive data of all channels at a time. Moreover, when the length of a video increases, the number of logic channels greatly increases, and therefore, the complexity of a system also becomes huge.

<Fast Broadcasting (FB)>

In the FB, video data is divided into segments having the same size and $2^{n-1}$ segments are transmitted through each channel. For example, the first segment is transmitted through the first channel and next two segments are transmitted through the second channel periodically. A client receives data from all channels. The amount of data is greatly increased when the channel changes sequentially, and therefore, the FB is possible with a small number of channels as compared to the above-described broadcasting services. However, the FB can be used only when a client is not limited in storage space and a network bandwidth. Accordingly, the FB is not suitable for various client environments.

<Fibonacci Pyramid Broadcasting (FPB)>

Like in the SB, a client has a network bandwidth of 2 b in FPB. However, the FPB provides a better dividing scheme than the SB by dividing video data at a ratio of a Fibonacci sequence like 1:2:3:5:13:21 . . . . Since numbers in the Fibonacci sequence increase more rapidly in those in the division ratio used in the SB, a video can be provided with a less number of channels in the FPB than in the SB. However, in the FPB, a transmission period increases by $2^{n-1}$ each time when transmission is repeated in a channel, and after three transmissions, the transmission period of the channel is greater than the size of data, which inhibits seamless playout of video.

The above-described conventional NVOD service methods require a large storage space for clients or a great network bandwidth for servers. It is difficult to use these conventional NVOD service methods for compact clients having a small storage space. Therefore, an NVOD service method that can be used in a network like a BcN including various types of clients is desired.

DISCLOSURE

Technical Problem

Some embodiments of the present invention provide a near video on demand (NVOD) service method and apparatus that can be used for a broadband convergence network (BcN), which includes clients having various storage capabilities and has various network transmission rates, that can reduce a transmission bandwidth for a server and/or an access latency by optimally using the network bandwidth and storage space of a client, and that can be used for a client having a limited bandwidth and storage space.

ADVANTAGEOUS EFFECTS

The present invention can be used in various communication environments like a broadband convergence network (BcN), allows the transmission bandwidth of a server to be used efficiently, and allows a terminal (i.e., a client) having a small storage space to efficiently receive video data. Accordingly, the present invention can be used for unified NVOD service.

BEST MODE

Figure 1:
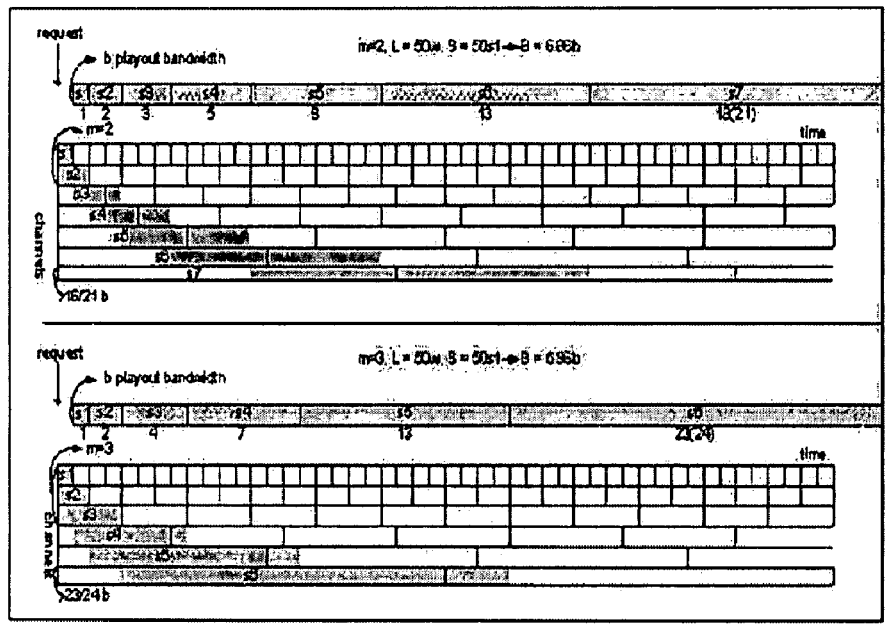
FIG. 1 illustrates services which are different according to the network bandwidth of a client.

According to some embodiments of the present invention, there is provided a near video on demand (NVOD) service method for transmitting video data including moving pictures to a plurality of clients in a network. The NVOD service method includes identifying a relative network bandwidth "m" of a client with respect to a video playout bandwidth, dividing the video data into data segments having different sizes according to the relative network bandwidth "m", and transmitting the data segments to the client through a plurality of channels.

The NVOD service method may further include determining whether a maximum value $S_{max}$ is set to restrict the sizes of the data segments, and when it is determined that the maximum value $S_{max}$ is set, restrict the sizes of the data segments not to exceed the maximum value $S_{max}$.

The transmitting of the data segments may include equalizing a transmission period of each channel to a playout length of a data segment, which is transmitted through the channel.

The transmitting of the data segments may include determining a bandwidth of a channel to correspond to a real size of a last data segment to reduce a transmission bandwidth of a server with a transmission period originally set for the channel.

The dividing of the video data may include dividing the video data into the data segments according to the equation:

$$S_n^m = \begin{cases} 2^{n-1} & (n \leq m) \\ \sum_{k=1}^{m} S_{n-k}^m & (n > m) \end{cases}$$

where "n" is 1 or an integer greater than 1 and indicates an order of a data segment and $S_n^m$ indicates a size of an n-th data segment.

According to other embodiments Of the present invention, there is provided an NVOD server for transmitting video data including moving pictures to a plurality of clients in a network. The NVOD server includes a data dividing unit configured to divide the video data into data segments having different sizes based on a relative network bandwidth "m" of a client with respect to a video playout bandwidth, and a data transmitting unit configured to transmit the data segments to the client through a plurality of channels.

The data dividing unit may define each of first "m" data segments to have a size having a value of $2^{i-1}$ where "i" is an integer from 1 to "m" define each of data segments following the "m" data segments to have a size which is equal to a sum of sizes of "m" data segments preceding each data segment, and when a size of each of the defined data segments exceeds a predetermined restriction value, restrict the size of each defined data segment to the predetermined restriction value.

The data transmitting unit may define "p" channels corresponding to the number of the data segments where "p" is 2 or an integer greater than 2, and transmit the data segments through the "p" channels, respectively.

The data transmitting unit may transmit all of the data segment except for a p-th data segment corresponding to a last data segment, through corresponding channels, respectively, with a predetermined bandwidth; and transmit the p-th data segment through a p-th channel with a bandwidth smaller than the predetermined bandwidth.

MODE FOR INVENTION

Hereinafter, embodiments of the present invention will be described in detail with reference to the attached drawings.

In addition to the above-described technical goal of the invention, a near video on demand (NVOD) service method according to some embodiments of the present invention aims at reducing a transmission bandwidth B (in units of Mbps) necessary for a server in a state where a waiting time (or an access latency) "w" a relative network bandwidth "m" of a client, and a maximum size $S_{max}$ (in units of MB) of storage space of the client are fixed. Here, "m" is the size of a relative network bandwidth of a client with respect to a video playout bandwidth "b" For example, when b=1 Mbps and a client's available network bandwidth is 2 Mbps, m=2. Meanwhile, the transmission bandwidth B necessary for the server is in inverse proportion to the waiting time "w". The $S_{max}$ may indicate the size of storage space of a client or may indicate a limited value set by a user. In other words, when an NVOD service method according to some embodiments of the present invention is used, the user can determine a value enabling the client, i.e., the user's terminal to optimally operate.

A method of dividing video and allocating channels may be divided into four stages as follows according to the maximum storage space $S_{max}$ of the client, the network bandwidth "m" of the client, and the video playout bandwidth "b" i) The first stage is for defining "m" segments in the video, which are downloaded to the client at a time. A scheme used in conventional Fast Broadcasting (FB) providing good efficiency may be used. In other words, "m" segments having a size of $s_i = s_1 \times 2^{i-1}$ are defined in the video. Here, $s_i$ indicates the size of an i-th (where "i" is 1 or an integer greater than 1) segment in a video having a total size of "s"

FIG. 1 illustrates services which are different according to the network bandwidth of a client.

Referring to FIG. 1, when m=2, the above-described scheme is used up to a second segment, and when m=3, the above described scheme is used up to a third segment.

ii) The second stage is for defining segments for channels coming after an m-th channel. If transmission of a first segment is finished through one channel among the "m" channels downloading segments simultaneously, a subsequent new channel is used for a download. For example, when m=2, as illustrated in FIG. 1, a download of a third segment is started when the download of the first segment (i.e., segment data) is finished. Each segment should have been completely downloaded at a point when the segment is supposed to be played. Referring to FIG. 1, when M=2, a Fibonacci sequence of 1, 2, 3, 5, 8, . . . is used. However, unlike conventional Fibonacci Pyramid Broadcasting (FPB), the playout length of a segment is made equal to a transmission period, thereby preventing interruption during playout of the video. In other words, the size of a segment is equalized to the transmission period.

When the client has a greater m, e.g., when m=3, the video can be divided at a more efficient ratio like 1:2:4:7:13 . . . . In this case, when all of "m" channels are used, the video can be divided at a ratio of a rapidly increasing number sequence and the bandwidth B necessary for the server can be reduced.

iii) In the third stage, when the size of a current segment is greater than $S_{max}$, the current segment and succeeding segments are defined to have the size of $S_{max}$. Accordingly, the NVOD according to some embodiments of the present invention can be used in limited client environments.

iv) In the fourth stage, when only small amount of data is left at the end of the video, the remaining data is transmitted with a large period so that the server's bandwidth B is reduced.

The stages i), ii), and iii) are related to video division and the stage iv) is related to the bandwidth of a last channel. The stages related with the video division may be defined by Equation (1):

$$S_n^m = \begin{cases} 2^{n-1} & (n \leq m) \\ \sum_{k=1}^{m} S_{n-k}^m & (n > m) \\ S_{max} & (S_n^m \geq S_{max}) \end{cases} \quad (1)$$

Here, $S_{max}$ indicates a maximum size of the client's storage space and $S_n^m$ indicates the size of an n-th (where "n" is 1 or an integer greater than 1) segment when the relative network bandwidth of the client is "m". The $S_{max}$ defines the maximum value of segmented video data and may be variably determined by an operator according to resources of the client and a communication environment. Accordingly, when $S_{max}$ is determined, the size of segmented video data (i.e., each data segment of a video) does not exceed $S_{max}$.

FIG. 1 illustrates states where a video having a length of 50 w is serviced when m=2 and when m=3. When m=2, the video is divided at a ratio of 1:2:3:5:8:13:21 according to Equation (1). That is, with respect to n=1, 2, 3, 4, 5, 6, 7, the video is divided like that $S_n^m = S_1$, 2 $S_1$, 3 $S_1$, 5 $S_1$, 8 $S_1$, 13 $S_1$, 21 $S_1$, where $S_1$=w. However, the total length of the video is 50 w, the last segment is not 21 $S_1$ but 18 $S_1$. In this case, data having a size of 18 $S_1$, is transmitted for a time of 21 w, and therefore, a seventh channel requires a channel size of $$\frac{18}{21}b.$$

As a result, B=6.86 b.

When m=3, the video is divided at a ratio of 1:2:4:7:13:24 according to Equation (1). That is, with respect to n=1, 2, 3, 4, 5, 6, 7, the video is Divided like that $S_n^m = S_1$, 2 $S_1$, 4 $S_1$, 7 $S_1$, 13 $S_1$, 24 $S_1$, where $S_i$=w. However, the total length of the video is 50 w, the last segment is 23 S. In this case, data having a size of 23$S_1$ is transmitted for a time of 24 w, and therefore, a sixth channel requires a channel size of $$\frac{23}{24}b.$$

As a result, B=5.96 b. The bandwidth of the client increases from 2 b to 3 b and the channel efficiency of the server increases by 13%. In other words, when the bandwidth of the client increases, data division and channel allocation can be performed with better efficiency.

Figure 2:
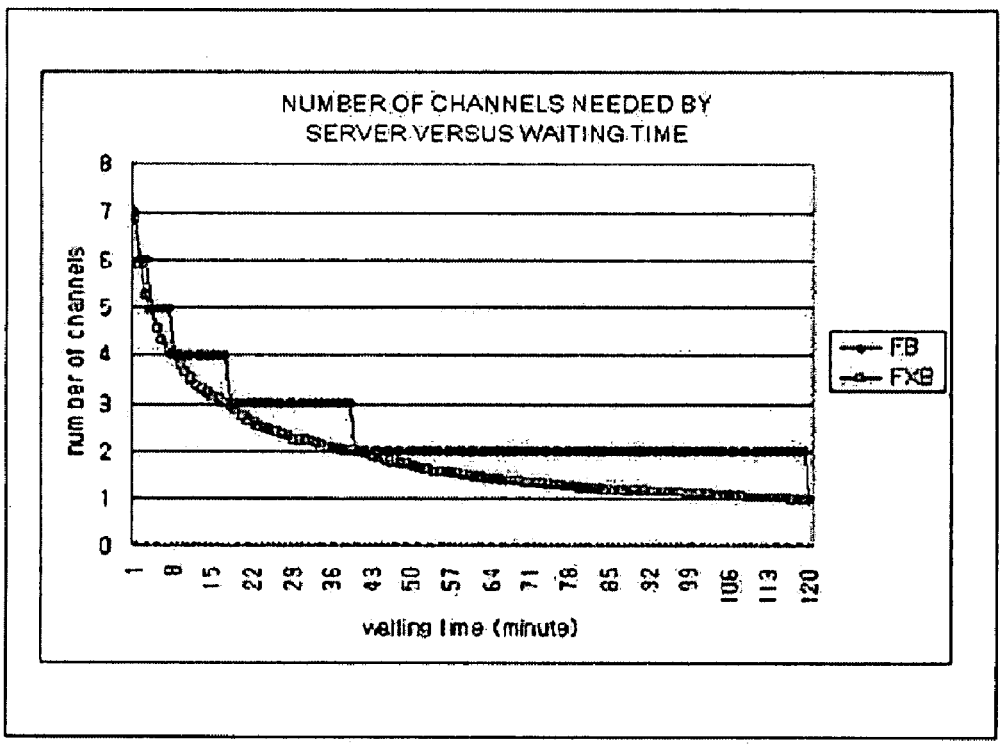
FIG. 2 is a graph illustrating a result of implementing a near video on demand (NVOD) service method according to some embodiments of the present invention in comparison with fast broadcasting performed when a client is not limited in a network bandwidth and storage space.
Figure 3:
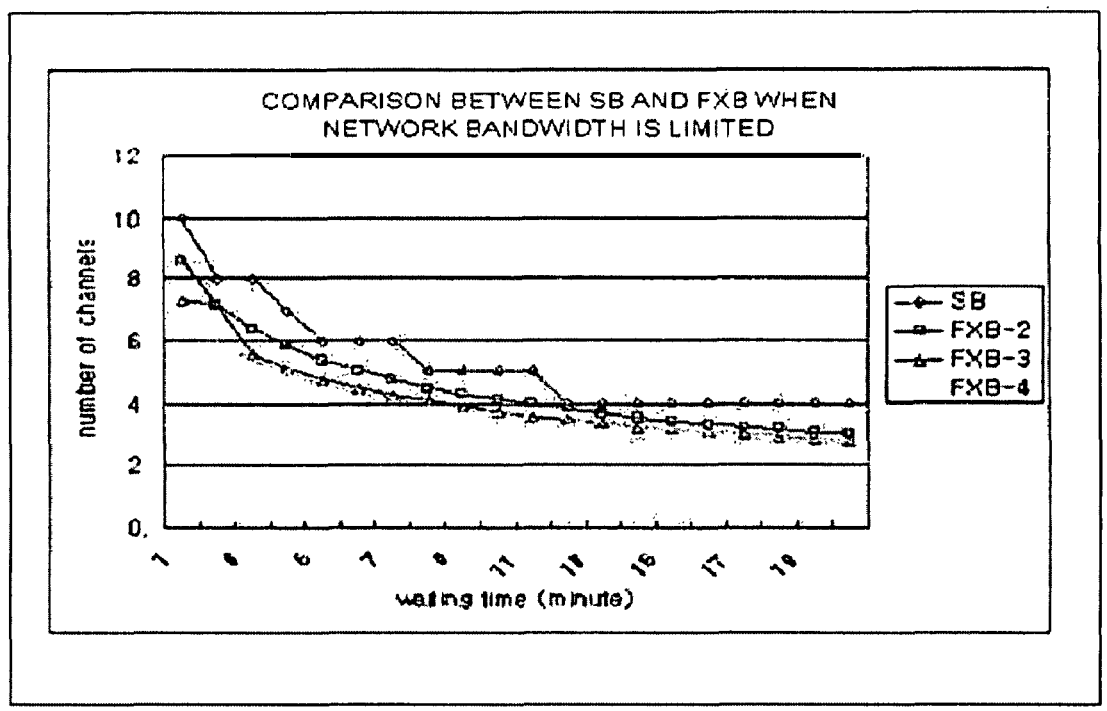
FIG. 3 is a graph illustrating a result of implementing a NVOD service method according to some embodiments of the present invention in comparison with skyscraper broadcasting performed when a client is limited in a network bandwidth and storage space.

FIG. 2 is a graph illustrating a result of implementing an NVOD service method according to some embodiments of the present invention in comparison with FB performed when a client is not limited in a network bandwidth and storage space. FIG. 3 is a graph illustrating a result of implementing a NVOD service method according to some embodiments of the present invention in comparison with Skyscraper Broadcasting (SB) performed when a client is limited in a network bandwidth and storage space. The NVOD service method according to some embodiment of the present invention can be used in any environment regardless of conditions of a server and a client. Accordingly, environments in which conventional methods can be used were assumed and theoretical comparison and analysis were performed.

When the client has a large network bandwidth and a large storage space, the conventional FB provides good performance. For this reason, the present invention was compared with an FB service method. Here, it was assumed that the playout length of a video was 120 minutes.

FIG. 3 illustrates a bandwidth necessary for a server with respect to a waiting time. The FB requires as many channels as integer multiples of "b" but flexible broadcasting (FXB) according to some embodiment of the present invention reduces the bandwidth B necessary for the server by transmitting the last segment (i.e., the last segmented data) with a low bandwidth. Meanwhile, when the network bandwidth of the client is limited, the conventional Pyramid Broadcasting (PB), SB, and FPB can be used. However, when the FPB is used, interruption may occur during the playout of the video and SB provides better performance than PB. For this reason, the conventional SB is compared with the FXB according to the present invention. In this case, it was also assumed that the length of the video is 120 minutes. When m=2, the FXB provides better efficiency than the SB. When "m" increases, the FXB provides much better efficiency.

When the client has a limited storage space, a method according to some embodiment of the present invention can limit the size of segments in the end portion of the video to $S_{max}$ like the SB. As a result, the method according to some embodiment of the present invention can be used for clients having limited storage space. In this case, the SB is used as it is, and therefore, only the effect corresponding to the SB illustrated in FIG. 3 will be obtained.

Figure 4:
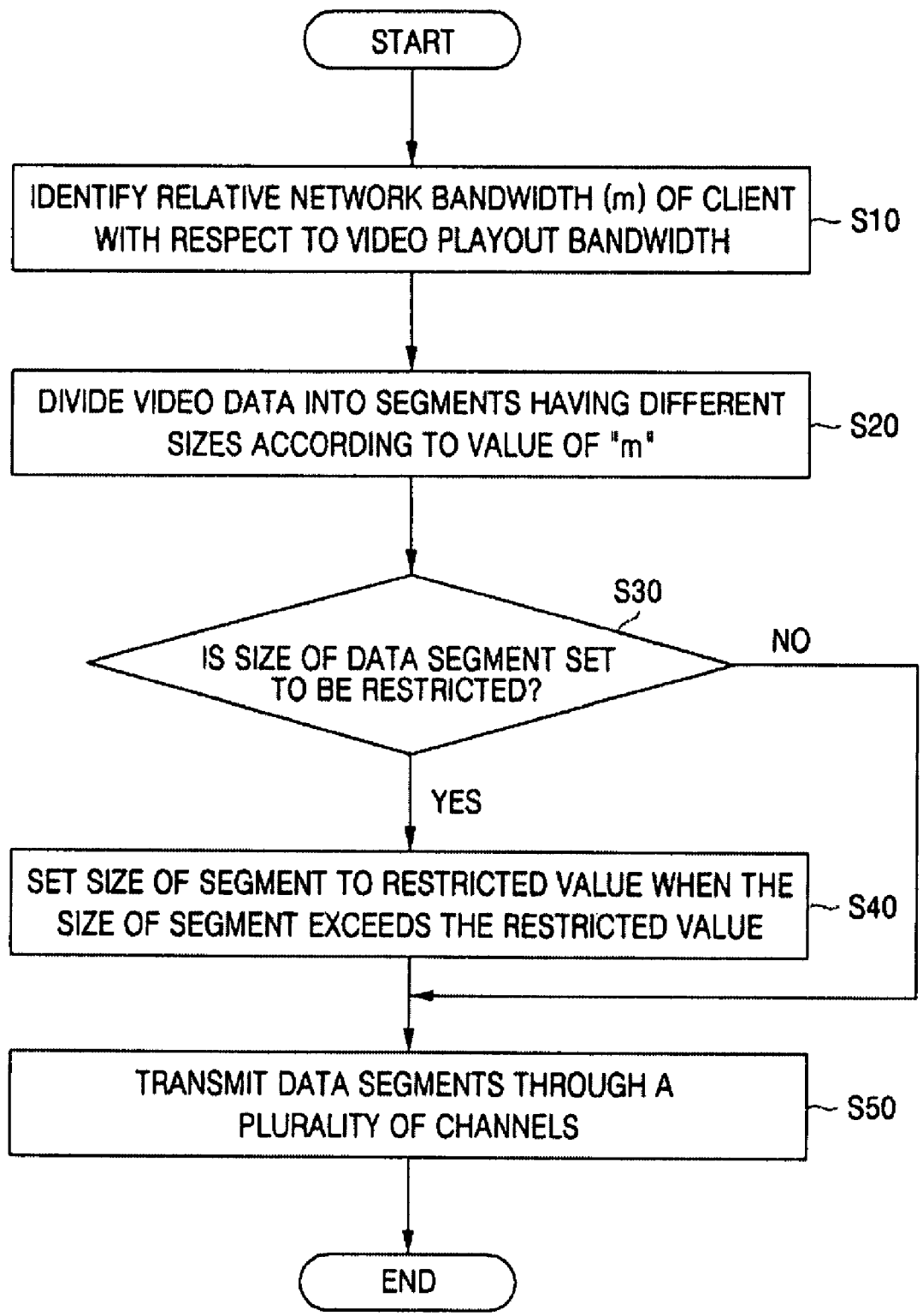
FIG. 4 is a flowchart of an NVOD service method according to some embodiment of the present invention.

FIG. 4 is a flowchart of an NVOD service method according to some embodiment of the present invention. The NVOD service method according to some embodiment of the present invention is performed through the following operations.

In operation S10, the relative network bandwidth "m" of a client with respect to the video payout bandwidth "m" is identified.

In the NVOD service method according to some embodiment of the present invention, the size of each segment into which video data is divided is determined based on the relative network bandwidth "m" of the client with respect to the video payout bandwidth "b" Accordingly, the value of "m" of the client receiving the video data needs to be identified. Although the value of "m" is different according to types of clients, the NVOD service method according to some embodiment of the present invention can be efficiently and economically used in any communication environments.

In operation S20, video data is divided into segments having different sizes according to the value of "m".

As described above, in an NVOD service method according to some embodiments of the present invention, the video data is divided and then transmitted through many channels. In this NVOD service method, the video data must be divided into a plurality of segments. The present invention provides a method of dividing the video data using Equation (1).

The division method using Equation (1) has been described above and will be described in detail with examples below.

The value of "m" varies with the type and the performance of a client. In the following examples, "m" has a value of 2 through 4. Since cases where m=2 and where m=3 are illustrated in FIG. 1, FIG. 1 may be referred to.

1) m=2

When a length L of the video data to be divided is 50 w and m=2, a first segment (i.e., n=1) and a second segment (i.e., n=2) are defined by the first definition in Equation (1).

Accordingly, data $S_1^m$ of the first segment and data $S_2^m$ of the second segment have sizes of 1 w and 2 w, respectively.

Continuously, as from a third segment (i.e., n=3, 4, . . . ), the second definition of Equation (1) is used. Accordingly, data $S_3^m$, $S_4^m$, $S_5^m$, $S_6^m$, $S_7^m$ . . . of segments coming after the second one respectively have sizes of 3 w, 5 w, 8 w, 13 w, 21 w.

However, since the length L of the video data is 50 w, the video data is divided into seven segments and the size of data of the seventh segment is not 21 w but is 18 w, . . . .

2) m=3

When the length L of the video data to be divided is 50 w and m=3, first through third segments are defined by the first definition in Equation (1). Accordingly, data $S_1^m$, $S_2^m$, and $S_3^m$ of the first through third segments have sizes of 1 w, 2 w, and 4 w, respectively.

Continuously, as from a fourth segment, the second definition of Equation (1) is used.

Accordingly, data $S_4^n$, $S_5^n$, $S_6^n$, $S_7^n$, $S_8^n$ . . . of segments coming after the third one respectively have sizes of 7 w, 13 w, 24 w, 44 w, 81 w.

However, since the length L of the video data is 50 w, the video data is divided into six segments and the size of data of the sixth segment is not 24 w but is 23 w, . . . .

3) m=4

When the length L of the video data to be divided is 50 w and m=4, first through fourth segments are defined by the first definition in Equation (1). Accordingly, data $S_1^m$, $S_2^m$, $S_3^m$ and $S_4^m$ of the first through fourth segments have sizes of 1 w, 2 w, 4 w, and 8 w, respectively.

Continuously, as from a fifth segment, the second definition of Equation (1) is used. Accordingly, data $S_5^m$, $S_6^m$, $S_7^m$, $S_8^m$ . . . of segments coming after the fourth one respectively have sizes of 15 w, 29 w, 56 w, 108 w, 208 w, . . . .

However, since the length L of the video data is 50 w, the video data is divided into six segments and the size of data of the sixth segment is not 29 w but is 20 w.

Next, in operation S30, it is determined whether the size of a segment into which the video data is divided is set to be restricted.

As described above, when the priority order of a segment increases, the size of data of the segment also increases. Accordingly, when a large amount of video data is divided, a segment is bigger as the priority order of the segment increases. However, it would be problem if a client receiving the video data does not have sufficient storage space for the video data. In addition, in order to optimize communication environments and system operations, the amount of data transmitted through a single channel may be restricted.

Accordingly, the NVOD service method according to some embodiments of the present invention may restrict the size of a segment into which the video data is divided.

When setting is made to restrict the size of a segment, even if the segment is supposed to have a size exceeding the maximum size $S_{max}$ according to Equation 1, the segment is restricted to the maximum size $S_{max}$ in operation S40. When the size restriction is not set, the video data is divided into segments according to Equation (1) without the size restriction.

In operation S50, segments of the video data are transmitted through a plurality of channels.

In the NVOD service method according to some embodiments of the present invention, in order to transmit video data segments to the client, at least two channels (e.g., "p" channels where "p" is 2 or an integer greater than 2) corresponding to the number of segments are defined and the video data segments are separately transmitted through the defined channels. Transmitting the video data segments in operation S50 will be described in detail below.

First, "p" channels corresponding to the number of the video data segments are defined. For example, when the length L of the video data is 50 w and m=2 (the case where m=2 in FIG. 1), the video data is divided up to seven segments. Accordingly, 7 channels (i.e., p=7) may be generated. When the length L of the video data is 50 w and m=3 (the case where m=3 in FIG. 1), the video data is divided up to six segments. Accordingly, 6 channels (i.e., p=6) may be generated.

After generating a plurality of (i.e., p) channels corresponding to the number of the data segments, all data segments except for a p-th (i.e., the last) data segment are respectively transmitted through corresponding channels with a bandwidth of "b". The p-th data segment, i.e., the last data segment is transmitted with a bandwidth less than "b" (e.g., a bandwidth of (18/21)b when m=2 and a bandwidth of (23/24)b when m=3). The transmission bandwidth for the p-th (i.e., last) data segment may be expressed by Equation (2):

$$\frac{s_p}{s'_p} \times b \qquad (2)$$

where $s_p$ is a real size of the last data segment and $s'_p$ is a size of the last data segment, which is obtained using Equation (1). For example, when the length L of the video data is 50 w and m=2 (the case where m=2 in FIG. 1), the size $s'_p$ of the last data segment, which is obtained using Equation (1), is 21 w and the real size $s_p$ of the last data segment is 18 w, and therefore, the last data segment may be transmitted with a bandwidth of (18/21)b. When the length L of the video data is 50 w and m=3 (the case where m=3 in FIG. 1), the size $s'_p$ of the last data segment, which is obtained using Equation (1), is 24 w and the real size $s_p$ of the last data segment is 23 w, and therefore, the last data segment may be transmitted with a bandwidth of (23/23)b. When m≧p, the transmission bandwidth for the p-th (i.e., the last) data segment may be expressed by Equation (3):

$$\frac{s_p}{2^{p-1}} \times b \qquad (3)$$

In some embodiments of the present invention, when data segments are separately transmitted through a plurality of channels, a transmission period of each channel is equalized to the playout length of data transmitted over the channel, thereby minimizing interruption during playout of a video. Meanwhile, as described above, even though video data is efficiently divided using an NVOD service method according to some embodiments of the present invention, the real size of a last data segment may be smaller than a size defined by the NVOD service method.

In this case, in the NVOD service method according to some embodiments of the present invention, the size of a channel for the last segment is determined based on the real size of the last segment. As a result, a transmission bandwidth for a server can be reduced and thus the channel efficiency of the server is improved.

The graphs illustrated in FIGS. 2 and 3 show that video data transmission is improved in terms of the number of channels and waiting time in the NVOD service method according to some embodiments of the present invention as compared to the conventional methods.

The NVOD service method according to some embodiments of the present invention may be embodied as computer programs, which may be stored in a recording medium.

In addition, the NVOD service method according to some embodiments of the present invention may be implemented by an NVOD server and an NVOD client. While the present invention has been shown and described with reference to exemplary embodiments thereof, it will be understood by those of ordinary skill in the art that various changes in form and detail may be made herein without departing from the spirit and scope of the present invention, as defined by the following claims.

INDUSTRIAL APPLICABILITY

The present invention can be used in various communication environments like a broadband convergence network (BcN), allows the transmission bandwidth of a server to be used efficiently, and allows a terminal (i.e., a client) having a small storage space to efficiently receive video data. Accordingly, the present invention can be used for unified NVOD service.

The invention claimed is:

1. A near video on demand (NVOD) service method for transmitting video data including moving pictures to a plurality of clients in a network, the NVOD service method comprising:
identifying a relative network bandwidth "m" of a client with respect to a video playout bandwidth;
dividing the video data into data segments having different sizes according to the relative network bandwidth "m"; and
transmitting the data segments to the client through a plurality of channels,
wherein the dividing of the video data comprises dividing the video data into the data segments according to the equation:

$$S_n^m = \begin{cases} 2^{n-1} & (n \leq m) \\ \sum_{k=1}^{m} S_{n-k}^m & (n > m) \end{cases}$$

where "n" is 1 or an integer greater than 1 and indicates an order of a data segment and $S_n^m$ indicates a size of an n-th data segment.

2. The NVOD service method of claim 1, further comprising:
determining whether a maximum value $S^{max}$ is set to restrict the sizes of the data segments; and
when it is determined that the maximum value $S^{max}$ is set, restrict the sizes of the data segments not to exceed the maximum value $S^{max}$.

3. The NVOD service method of claim 1, wherein the transmitting of the data segments comprises equalizing a transmission period of each channel to a playout length of a data segment, which is transmitted through the channel.

4. The NVOD service method of claim 1, wherein the transmitting of the data segments comprises determining a bandwidth of a channel to correspond to a real size of a last data segment to reduce a transmission bandwidth of a server with a transmission period originally set for the channel.

5. A near video on demand (NVOD) service method for transmitting video data including moving pictures to a plurality of clients in a network, the NVOD service method comprising:
identifying a relative network bandwidth "m" of a client with respect to a video playout bandwidth;

dividing the video data into data segments having different sizes according to the relative network bandwidth "m"; and transmitting the data segments to the client through a plurality of channels, wherein the dividing of the video data comprises:

defining each of first "m" data segments to have a size having a value of "$2^{i-1}$" where "i" is an integer from 1 to "m", defining each of data segments following the "m" data segments to have a size which is equal to a sum of sizes of "m" data segments preceding each data segment; and when a size of each of the defined data segments exceeds a predetermined restriction value, restricting the size of each defined data segment to the predetermined restriction value.

6. The NVOD service method of claim 5, wherein the transmitting of the data segments comprises:

defining "p" channels corresponding to the number of the data segments where "p" is 2 or an integer greater than 2; and transmitting the data segments through the "p" channels, respectively.

7. The NVOD service method of claim 6, wherein the transmitting of the data segments through the "p" channels, respectively, comprises:

transmitting all of the data segment except for a p-th data segment corresponding to a last data segment through corresponding channels, respectively, with a predetermined bandwidth; and transmitting the p-th data segment through a p-th channel with a bandwidth smaller than the predetermined bandwidth.

8. A non-transitory recording medium for recording a computer program for executing the method of claim 1.

9. A near video on demand (NVOD) server for transmitting video data including moving pictures to a plurality of clients in a network, the NVOD server comprising:

a data dividing unit configured to divide the video data into data segments having different sizes based on a relative network bandwidth "m" of a client with respect to a video playout bandwidth; and a data transmitting unit configured to transmit the data segments to the client through a plurality of channels, wherein the data dividing unit defines each of first "m" data segments to have a size having a value of "$2^{i-1}$" where "i" is an integer from 1 to "m", defines each of data segments following the "m" data segments to have a size which is equal to a sum of sizes of "m" data segments preceding each data segment, and when a size of each of the defined data segments exceeds a predetermined restriction value, restricts the size of each defined data segment to the predetermined restriction value.

10. The NVOD server of claim 9, wherein the data transmitting unit defines "p" channels corresponding to the number of the data segments where "p" is 2 or an integer greater than 2, and transmits the data segments through the "p" channels, respectively.

11. The NVOD server of claim 10, wherein the data transmitting unit transmits all of the data segment except for a p-th data segment corresponding to a last data segment through corresponding channels, respectively, with a predetermined bandwidth; and transmits the p-th data segment through a p-th channel with a bandwidth smaller than the predetermined bandwidth.

12. The NVOD server of claim 9, wherein the data transmitting unit equalizes a transmission period of each channel to a playout length of a data segment, which is transmitted through the channel.

13. A non-transitory recording medium for recording a computer program for executing the method of claim 5.

* * * * *